United States Patent Office 3,415,989
Patented Dec. 10, 1968

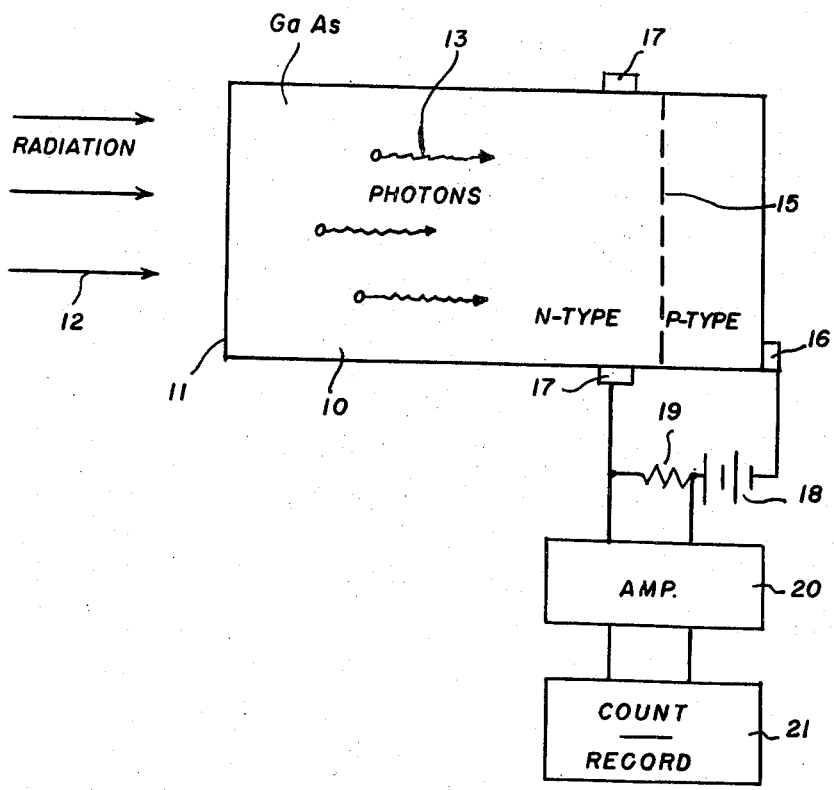

3,415,989
SCINTILLATION DETECTOR USING A SINGLE CRYSTAL OF GALLIUM ARSENIDE
Edwin A. Leventhal, Tarrytown, Gertrude F. Neumark, Hartsdale, and Edmund S. Rittner, White Plains, N.Y., assignors to North American Philips Co., Inc., New York, N.Y., a corporation of Delaware
Filed Feb. 3, 1966, Ser. No. 524,951
9 Claims. (Cl. 250—71.5)

ABSTRACT OF THE DISCLOSURE

An improved scintillation detector for X-ray and nuclear radiations exhibiting improved energy resolution. In the preferred form, the detector comprises a single crystal of gallium arsenide. One end of the gallium arsenide crystal is used as a scintillator to convert the incident radiation into photons. The opposite end of the crystal is provided with an internal p-n junction acting as a photodetector for the photons generated within the first end. The two regions of the crystal are given compositions to insure that the photons generated at the scintillating end are transmitted whereas the same photons are strongly absorbed in the photodetecting end. These results are achieved, for example, by changing the bandgap or by appropriate doping with impurities.

---

This invention relates to an improved scintillation detector for detecting X-ray and nuclear radiations.

Known scintillation detectors or counters comprise a scintillator in combination with a photodetector. The radiation to be detected is absorbed in the scintillator, generally a phosphor, which converts all or part of the absorbed energy to photons in the visible or infrared spectral region. The photons are received on a photosensitive cathode of a photomultiplier tube, liberating photoelectrons which are accelerated by a series of anodes to produce an output current that is a large multiple of the current leaving the cathode.

The energy resolution of such a detector, one of its most important properties, is limited by the statistical fluctuations of the output signals that result from identical incident radiation events. If the average output signal is produced by N photoelectrons, the root mean square deviation from this average is $\sqrt{N}$, and the relative energy resolution is $1/\sqrt{N}$. In terms of the properties of a scintillation counter, $N = (E/\bar{\epsilon}_p)\gamma\eta$, where E is the energy absorbed in the phosphor, $\bar{\epsilon}$ is the average energy required by the phosphor to produce a useful photon, $\gamma$ is an optical coupling factor, and $\eta$ is a photodetector efficiency factor. The quantity $\bar{\epsilon}_p/\gamma\eta$ can be as $\bar{\epsilon}$, the effective energy required to produce an output event. For good resolution $\epsilon$ should be as small as possible. For the commonly used thallium-activated NaI scintillation counter $\bar{\epsilon}_p$ is about 20 ev.; in a typical optical arrangement, $\gamma$ would be about 0.35, and $\eta$ for a typical photomultiplier tube would be about 0.15. For the values indicated above, $\bar{\epsilon}$ is about 400 ev. This relatively high figure explains the limited resolution of these known counters.

The main object of our invention is a scintillation detector exhibiting better energy resolution than existing scintillation counters.

A further object of our invention is a highly compact scintillation counter.

These and other objects of our invention are achieved by employing a single crystal of gallium arsenide (GaAs) as a basis for both the scintillator and the photodetector.

The photodetector portion is formed by an internal p-n junction acting as a photodiode in an end portion of the gallium arsenide scintillator. The two regions of the crystal are given a composition to ensure that the light emitted by the scintillating portion reaches and is strongly absorbed in the photodetecting portion, as will be described in greater detail hereinafter.

A principle of our invention is to employ a scintillating portion exhibiting improved energy conversion, as well as an efficient and integral photodetecting portion providing improved optical coupling between the scintillating and detecting parts and improved photodetector efficiency. Gallium arsenide when doped with n-type impurities such as tellurium or selenium in the range of about $8 \times 10^{17}$ to $5 \times 10^{18}$ atoms/cm.$^3$ has a high fluorescence efficiency, as has been demonstrated by Cusano as reported in Solid State Communications, 2, 353–358 (1964). For example, with a doping density of $3 \times 10^{18}$ atoms of selenium or tellurium per cm.$^3$, the efficiency is 60% at 77° K. The energy required to produce a pair of free carriers in the scintillating portion of the gallium arsenide is about 4.5 ev., so that $\bar{\epsilon}_p$ for gallium arsenide is about 7.5 ev. The high index of refraction of GaAs produces a very high degree of internal reflection, which, though a disadvantage in usual scintillator-photomultiplier combinations due to the inability of getting the photons out of the scintillator, is turned into an advantage when the photodetecting portion is an integral part of the structure. With such a construction, $\eta$ and $\gamma$ can be close to unity and $\bar{\epsilon}$ can be reduced by over an order of magnitude, down to approximately 10 ev. This gives an energy resolution approximately six times better than existing scintillation counters. Even if the detector is maintained at room temperature (300° K.) thereby reducing the quantum efficiency of the scintillator to the order of 20%, still an energy resolution approximately three times better than the prior art scintillation counters can be achieved.

Other objects and advantages of our invention will be more readily apparent from the detailed description which follows of several embodiments thereof taken in conjunction with the accompanying drawing whose sole figure is a partly schematic, side view of one form of scintillation detector in accordance with our invention.

In the drawing, our novel detector comprises a crystal 10 of gallium arsenide with a concentration of about $3 \times 10^{18}$ tellurium donors per cubic centimeter. The body includes a receiving surface 11 onto which impinges the radiation 12 to be detected, which may be X-rays, alpha and beta particles, gamma radiation, or the like. The body 10 is given a depth (the dimension in the direction of the radiation) sufficient to absorb the radiation within its bulk, which, as is well known, depends upon the penetrating nature of the radiation being detected. One of the features of the invention is that the scintillating part of the gallium arsenide body 10 can be made as thick as is required to absorb the incident radiation 12 without, as in the ordinary p-n junction detector, causing an unacceptable increase in the junction reverse current and resultant noise. As is shown schematically in the figure, the bulk part of the gallium arsenide converts the radiation 12 into a number of photons designated 13 which then radiate through the body 10 in all directions. Very few escape from the body due to total internal reflection at the surface. To detect the photons and convert same into electrical pulses, there is provided in the remote end of the body an internal p-n junction 15, contacts 16 and 17, 17 being an annular contact surrounding the body, being made to regions of the body on opposite sides of the junction 15. The junction is back-biased by a battery 18 in an external circuit connected in series with a load resistor 19, and the voltage pulses generated across the load resistor are amplified in a conventional low noise amplifier 20, and the number counted and recorded 21 in the conventional manner. With such a counter, the number of pulses recorded is an indication of the intensity of the incident radiation, and the energy thereof is indicated by the magnitude of the voltage pulses.

The structure illustrated may be made by techniques well known in the art. A gallium arsenide crystal can be grown from the melt by any of the standard techniques to contain a concentration of a donor impurity, e.g., tellurium, to produce n-type gallium arsenide. To produce the internal p-n junction, an acceptor impurity such as zinc or cadmium can be diffused into one end of the gallium arsenide crystal. In a typical case, the n-doped gallium arsenide can be sealed in a quartz capsule containing a supply of zinc arsenide, and the capsule heated at, say, 1000° C. for a sufficient length of time to produce a p-type region with an average acceptor concentration of the order of $10^{19}/cm.^3$ and thus a p-n junction 15 in the crystal. The remaining surfaces of the gallium arsenide crystal can be protected by suitable masking, or the zinc-diffused regions removed where undesired by etching. Contacts are easily made to the gallium arsenide by soldering or by using bismuth alloyed thereto, with the bismuth doped with tin to form the contact to the p-type region, and with the bismuth doped with silver to form a contact to the n-type region.

For efficient operation of the device it is required that the emission wavelength be strongly absorbed in the detecting (junction) region. It follows that the emitted radiation must be of higher energy than the absorption edge of the detecting region. The energy of the emitted light from Te or Se doped GaAs is very close to the absorption edge of the pure material, being slightly lower at low dopant concentrations and of even higher energy at high dopant concentrations. Since the absorption edge of strongly doped ($\geq 10^{19}/cm.^3$) p-type GaAs extends to lower energies than the edge of pure material, the described configuration is favorable in this respect.

The scintillating portion and/or the photodetecting portion of the device can also be modified in other ways so that very strong absorption of the optical photons in the p-n junction photodetector is assured. This can be done, for instance, by using a mixed crystal of GaAs-GaP or GaAs-AlAs as the scintillating portion. The energy of the radiation emitted by GaAs-GaP increases with increasing phosphorus content and it is thus possible by the addition of phosphorus to obtain radiation on the short wavelength (strong absorption) side of the GaAs absorption edge. This can be achieved in practice by diffusing phosphorus into the scintillator end to produce the mixed crystal, or by growing a mixed crystal $GaAs_{1-x}P_x$ on the gallium arsenide as a substrate. Even with $x$ as small as 0.1 in the formula, a significant shift of the photon emission to higher energies is obtained. Alternatively, absorption in the photodetecting portion can be enhanced if the material is doped so that the junction is highly compensated, since absorption increases with the amount of compensation. Or, very strong absorption can be obtained by preparing a mixed crystal such as GaAs-GaSb or GaAs-InAs for the photodetecting portion, since these systems have absorption edges at energies lower than that of GaAs. It will also be appreciated that it is within our contemplation that the geometry of the junction 15 relative to the receiving surface 11 may be appropriately modified to increase the collection efficiency, such as by surrounding the scintillator bulk with the junction 15 to further reduce the loss of generated photons. However, this arrangement is suitable only so long as the reverse leakage current of the photodetecting portion, which is a source of noise, is kept small. This current can always be suppressed by cooling the device. If large area devices are required without cooling, the geometry can be modified so that the surface receiving the radiation is larger than the surface into which the junction is diffused, since at a given temperature the reverse leakage current may be minimized by decreasing the volume of the photodetecting portion.

Nor is our invention limited to the use of photodiodes as the photodetector. It is also possible to construct in the gallium arsenide, by techniques well known in the art, a bipolar phototransistor, or a field-effect transistor in place of a photodiode, in order to yield higher outputs and a higher signal-to-noise ratio.

While we have described our invention in connection with specific embodiments and applications, other modifications thereof will be readily apparent to those skilled in this art without departing from the spirit and scope of the invention as defined in the appended claims.

What is claimed is:

1. A scintillation detector for incident radiation comprising a field-free scintillator crystal in combination with a semiconductor photodetector, said scintillator comprising a single crystal comprised primarily of gallium arsenide for receiving the incident radiation and having a thickness in the direction of the incident radiation sufficient to absorb wthin the bulk of the crystal the radiation and convert same to photons of a certain energy, said scintillator crystal having a composition producing an absorption edge at an energy value above the energy of the photons, said semiconductor photodetector having an internal p-n junction and a composition in the vicinity of the junction producing an absorption edge at an energy value below the energy of the said photons.

2. A detector as set forth in claim 1 and including means for biasing said p-n junction in the reverse direction.

3. A detector as set forth in claim 1 wherein the p-n junction is highly compensated to increase its absorption.

4. A scintillation detector for incident radiation comprising a field-free scintillator integral with a semiconductor photodetector, said scintillator comprising a single crystal comprised primarily of gallium arsenide for receiving the incident radiation and having a thickness in the direction of the incident radation sufficient to absorb within the bulk of the crystal the radiation and convert same to photons of a certain energy, said scintillator crystal being doped with selenium or tellurium to form n-type material producing photons having energy values below the absorption edge of the scintillator, said semiconductor photodetector comprising a p-n junction internal to the gallium arsenide crystal and including contacts to the crystal at regions thereof on opposite sides of the p-n junction, said p-n junction being spaced from the crystal regions where most of the incident radiation is absorbed, said p-type part of the crystal having a composition producing an absorption edge at an energy value below the energy of the said photons.

5. A detector as set forth in claim 4 wherein the n-type material contains a doping density of between about $8 \times 10^{17}$ and $5 \times 10^{18}$ atoms/cm.$^3$.

6. A detector as set forth in claim 4 wherein the p-type part of the crystal contains zinc or cadmium as an acceptor in a concentration in excess of $10^{19}/cm.^3$.

7. A scintillation detector for incident radiation comprising a field-free scintillator integral with a semiconductor photodetector, said scintillator comprising a single crystal comprised primarily of gallium arsenide for receiving the incident radiation and having a thickness in the direction of the incident radiation sufficient to absorb within the bulk of the crystal the radiation and convert same to photons of a certain energy, said scintillator crystal having a composition producing an absorption edge at an energy value above the energy of the photons, said semiconductor photodetector comprising a p-n junction internal to the gallium arsenide crystal and having a composition in the vicinity of the junction producing an absorption edge at an energy value below the energy of the said photons, one of the scintillator and photodetector portions of the crystal being a mixed crystal of gallium arsenide, and contacts to the crystal at regions thereof on opposite sides of the p-n junction, said p-n junction being spaced from the crystal regions where most of the incident radiation is absorbed.

8. A detector as set forth in claim 7 wherein the scintillator portion is of a gallium arsenide mixed crystal having a higher forbidden bandgap than that of the crystal portions adjacent the p-n junction.

9. A detector as set forth in claim 7 wherein the crystal portions adjacent the p-n junction is of a gallium arsenide mixed crystal having a smaller forbidden bandgap than that of the scintillator portion.

References Cited

UNITED STATES PATENTS 2,991,366   7/1961   Salzberg _____ 317—235

RALPH G. NILSON, *Primary Examiner.*

M. ABRAMSON, *Assistant Examiner.*

U.S. Cl. X.R.

250—83; 317—235

PO-1050
(5/69)

UNITED STATES PATENT OFFICE
CERTIFICATE OF CORRECTION

Patent No. __3,415,989__    Dated __December 10, 1968__

Inventor(s) __E. A. LEVENTHAL ET AL__

It is certified that error appears in the above-identified patent and that said Letters Patent are hereby corrected as shown below:

Column 1, line 51, "$\bar{\epsilon}$" should have read -- $\bar{\epsilon}_p$ -- .

Column 1, line 55, after "be" should have been inserted -- defined -- .

Column 4, line 22, "wthin" should have been -- within -- .

Signed and sealed this 24th day of February 1970.

SIGNED AND
SEALED
FEB 24 1970

(SEAL)
Attest:

Edward M. Fletcher, Jr.
Attesting Officer

WILLIAM E. SCHUYLER, JR.
Commissioner of Patents